(12) United States Patent
Miura et al.

(10) Patent No.: US 12,202,429 B2
(45) Date of Patent: Jan. 21, 2025

(54) AIRBAG DEVICE

(71) Applicant: Autoliv Development AB, Vargarda (SE)

(72) Inventors: Yuka Miura, Kanagawa (JP); Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/577,063

(22) PCT Filed: Jun. 16, 2022

(86) PCT No.: PCT/JP2022/024232
§ 371 (c)(1),
(2) Date: Jan. 5, 2024

(87) PCT Pub. No.: WO2023/282019
PCT Pub. Date: Jan. 12, 2023

(65) Prior Publication Data
US 2024/0300435 A1    Sep. 12, 2024

(30) Foreign Application Priority Data
Jul. 9, 2021    (JP) ................................ 2021-114626

(51) Int. Cl.
*B60R 21/231*    (2011.01)
*B60R 21/2338*    (2011.01)
*B60R 21/239*    (2006.01)

(52) U.S. Cl.
CPC .... *B60R 21/23138* (2013.01); *B60R 21/2338* (2013.01); *B60R 21/239* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | | |
|---|---|---|---|---|
| 3,953,049 A | * | 4/1976 | Surace | B60R 21/18 280/733 |
| 9,533,651 B1 | * | 1/2017 | Ohno | B60N 2/914 |
| 9,932,011 B2 | * | 4/2018 | Hiraiwa | B60R 21/207 |

(Continued)

FOREIGN PATENT DOCUMENTS

| | | |
|---|---|---|
| JP | 2006-8105 A | 1/2006 |
| JP | 2019-18791 A | 2/2019 |
| JP | 2019-34710 A | 3/2019 |

*Primary Examiner* — Toan C To
(74) *Attorney, Agent, or Firm* — Foley & Lardner LLP

(57) ABSTRACT

An airbag device comprises: an airbag including a head-protecting cushion that protects the head of an occupant by being deployed from an upper portion on the left or right side of a vehicle seat; and an inflator that supplies an inflation gas to the airbag. The head-protecting cushion comprises: a first chamber that protects an area near one side of the head of the occupant; a second chamber connected to the first chamber and which protects the front of the head of the occupant; a third chamber connected to the second chamber and which is deployed to span from the front of the head of the occupant to the other side of the head of the occupant; and a fourth chamber connected to the third chamber and which is deployed in an area near the other side of the head of the occupant.

12 Claims, 16 Drawing Sheets

(56) References Cited

U.S. PATENT DOCUMENTS

| | | | |
|---|---|---|---|
| 10,093,266 B2* | 10/2018 | Sugie | B60R 21/207 |
| 10,710,539 B2* | 7/2020 | Cho | B60R 21/207 |
| 12,005,850 B2* | 6/2024 | Nakajima | B60R 21/235 |
| 2012/0013107 A1 | 1/2012 | Shankar | |
| 2013/0093224 A1* | 4/2013 | Dainese | B60R 21/207 |
| | | | 297/216.12 |

* cited by examiner

From above

Inner panel

Outer panel (A)

(B)

(A)

(B)

(C)

A3-A3

AIRBAG DEVICE

TECHNICAL FIELD

The present invention relates to an airbag device equipped in a vehicle seat. In particular, relates to an airbag device able to appropriately protect a head of an occupant.

CONVENTIONAL TECHNOLOGY

Providing a vehicle with one or a plurality of airbag devices in order to protect an occupant therein in the event of a vehicle accident is well known. There are various forms of airbag devices, such as so-called driver airbag devices that deploy from near the center of a steering wheel to protect a driver, curtain airbags that deploy downward inside a window to protect an occupant in the event of a lateral impact, rollover, or overturning accident, side airbag devices that are deployed to a side of an occupant (side of a seat) to protect the occupant in the event of a lateral impact of the vehicle, and the like.

Side airbag devices restrain occupant lateral direction movement using airbags that deploy forward from sides of seats, and such devices capable of protecting not only the body but also the head of an occupant, such as in the invention disclosed in Patent Document 1 for example, have been proposed.

However, although the airbag device disclosed in Patent Document 1 can restrain one side of an occupant's head (either left or right side) with a deployed airbag, it is, practically speaking, impossible for such devices to protect the heads from the front or on an opposite side.

PRIOR ART DOCUMENTS

Patent Document

[Patent Document 1] Japanese Unexamined Patent Application Publication 2019-137307

SUMMARY OF THE INVENTION

Problem to be Solved by the Invention

The present invention has been created in view of the above circumstances, and an object thereof is to provide a revolutionary airbag device that can protect an occupant's head from one side, from the front, or from the other side.

Means for Solving the Problem

In order to solve the problems described above, the airbag device according to the present invention includes an airbag with a head protecting cushion that protects a head of an occupant by deploying from above on either the left or right of a vehicle seat, and an inflator that supplies inflation gas to the airbag. The head protecting cushion includes a first chamber that protects a vicinity near one side of the head of the occupant, a second chamber that is connected to the first chamber and that protects the front of the head of the occupant, a third chamber that is connected to the second chamber and that deploys from the front across to the other side of the head of the occupant, and a fourth chamber that is connected to the third chamber and that deploys in a vicinity near the other side of the head of the occupant. The third chamber and the fourth chamber are structured to be connected by a first vent hole, and linked to one another by stitching around the first vent hole. Additionally, the fourth chamber, with the head protecting cushion stowed therein, is tucked inside the third chamber through the first vent hole.

Here, "tucked in" means, broadly speaking, being folded inward. In the present invention, this may be interpreted as being folded, pushed, or packed inside another linked chamber through a vent hole, and thus may include not just folding and inserting in a regulated manner, but also, to a certain extent, casual packing as well.

Because the head of the occupant is, according to the present invention, surrounded on one side, in front, and on the other side, the head of the occupant can reliably be restrained regardless of seat position, reclining angle, or the like. Furthermore, the airbag is able to demonstrate stable performance independently when deploying without depending on seat position, or the like, because the airbag does not need to use a steering wheel, instrument panel, or the like, as a reaction surface.

Additionally, because the leading side (downstream side) of the fourth chamber is tucked inside the adjacent third chamber in the present invention, the deployment of the fourth chamber is delayed compared to that of the first through the third chambers. Therefore, the tip (most downstream side) of the fourth chamber deploys immediately after passing in front of the head of the occupant, and thus the fourth chamber is able to deploy without interfering with the head of the occupant.

The second chamber and the third chamber are structured connected by a second vent hole, and linked to one another by stitching around the second vent hole, and the third chamber, with the head protecting cushion stowed therein, is tucked inside the second chamber through the second vent hole.

By further tucking the third chamber, into which the fourth chamber has been tucked (stowed), into the second chamber, the first through fourth chambers can be deployed in stages, rather than deploying all at once from an upstream side (one side of the head of the occupant) to a downstream side (the other side of the head of the occupant).

With the head protecting cushion stowed, the outer peripheral portion of the third chamber can be tucked in toward the center of the chamber.

A tether that restricts the deployment of the third chamber is provided therein, and the outer peripheral portion of the third chamber can be tucked in toward the tether.

The first chamber and the second chamber can be formed integrally by adhering two pieces of base fabric together.

The third chamber is formed by adhering at least two pieces of base fabric together, and a vicinity of an end part of an inner panel of the base fabric that forms the second chamber facing the occupant and a vicinity of an end part of an inner panel facing the occupant of the base fabric that forms the third chamber can be linked.

By linking the inner base fabric panels together, a linked portion is kept from spreading outward (in a direction away from the head of the occupant) when the airbag deploys, making it easier to form a curved shape that surrounds the head of the occupant.

The fourth chamber can be formed by folding one piece of base fabric or by adhering two pieces of base fabric together.

The airbag may also include a side protecting chamber that protects the body side of the occupant by connecting a vicinity of the lower end of the first chamber.

The inflator can be provided inside the side protecting chamber and configured so that inflation gas flows from the side protecting chamber into the first chamber, the second chamber, the third chamber, and the fourth chamber.

The first chamber may include an upper direction part that first deploys upward and a forward direction part that is connected to the upper direction part and that deploys forward.

When the airbag is stowed, the first chamber, second chamber, third chamber, and fourth chamber that form the head protecting cushion can be folded vertically as one unit, and then folded into a roll or a bellows backwards from a tip end part corresponding to a front of a vehicle.

Here, "vertically" can be understood as a direction orthogonal to the longitudinal direction of the head protecting cushion. Additionally, "a tip end part corresponding to a front of a vehicle", corresponds to the tip end part of the fourth chamber when the head protecting cushion is fully deployed. However, when the airbag is stowed and the fourth chamber is tucked inside the third chamber, the tip of the third chamber or the tip of the second chamber corresponds to the tip end part.

The vehicle seat according to the present invention also includes, in addition to the airbag device described above, a side airbag device that protects the side of the occupant on a side opposite the side in which the airbag device is stowed.

EMBODIMENTS OF THE INVENTION

The airbag device according to the present invention will be described with reference to the accompanying drawings. In the description below, when an occupant is seated in a seat in a normal posture, the direction the occupant faces is referred to as the "front", the opposite direction is referred to as the "back", and the direction indicating the coordinate axis is referred to as the "front-to-back direction". Moreover, when the passenger is seated in the seat in a regular posture, the right of the passenger is referred to as the "right direction", the left of the passenger is referred to as the "left direction", and the direction indicating the coordinate axis is referred to as the "left and right direction". Furthermore, when the occupant is seated in the seat in a regular posture, a head direction of the occupant is referred to as "up", a waist direction of the occupant is referred to as "down", and a direction indicating the coordinate axis is referred to as an "up-down direction". Moreover, the side of a deployed airbag facing the occupant (head) is referred to as inside and the opposite side is referred to as outside.

Figure 1:
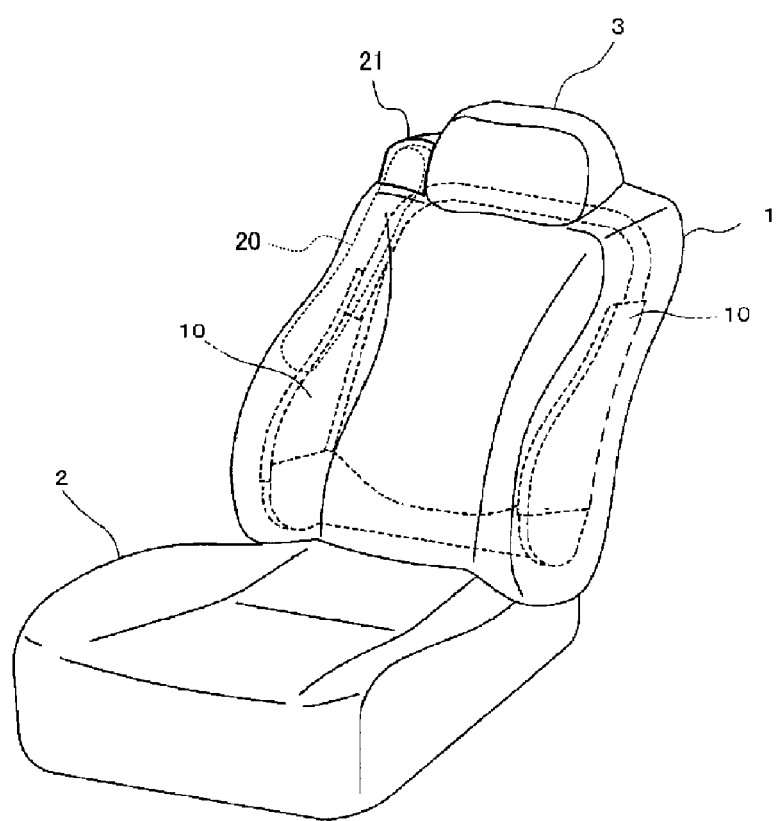
FIG. 1 is a perspective view mainly depicting the external shape of a vehicle seat to which the airbag device according to the present invention can be applied.
Figure 2:
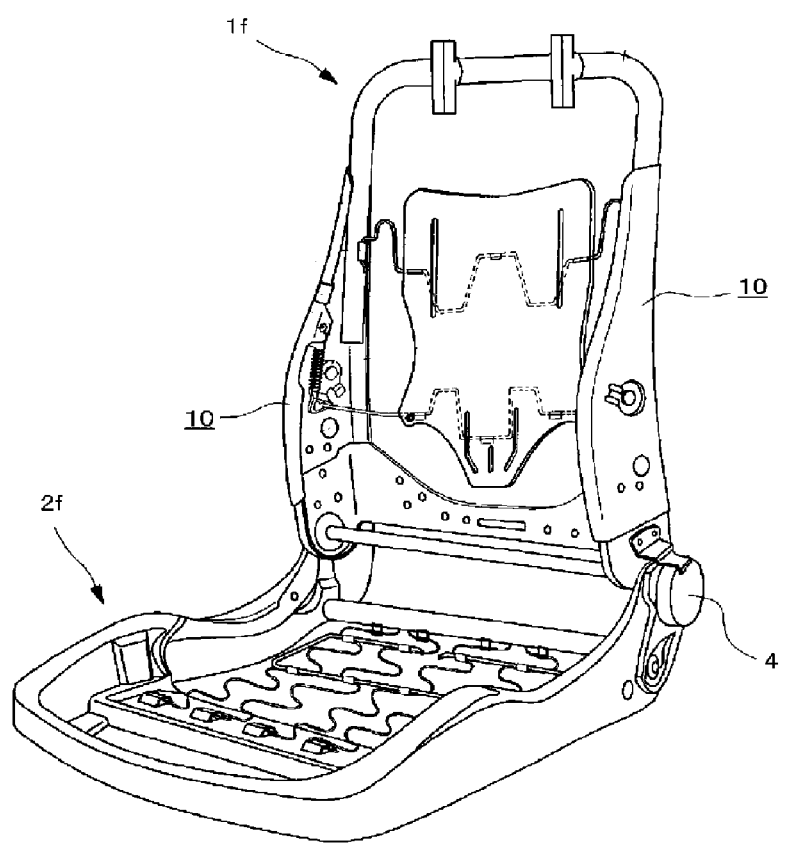
FIG. 2 is a perspective view depicting an internal structure (seat frame) functioning as a framework of the vehicle seat depicted in FIG. 1, with a depiction of the airbag device omitted.

FIG. 1 is a perspective view mainly depicting the external shape of a vehicle seat used for an occupant protecting device according to the present invention. FIG. 2 is a perspective view depicting an internal structure (seat frame) functioning as a framework of the vehicle seat depicted in FIG. 1, with a depiction of an airbag device (20) omitted therefrom.

As depicted in FIGS. 1 and 2, seen as the location, the vehicle seat to which the present invention can be applied includes: a seat cushion 2 of a part on which an occupant is seated, a seat back 1 forming a backrest, and a headrest 3 connected to the upper end of the seat back 1.

As depicted in FIG. 1, the airbag device 20 according to the present embodiment is stowed in a side supporting part (far side) of the vehicle seat. Symbol 21 is a housing that stows one part (head protecting cushions 32, 34, 36, and 38) of the airbag that configures the airbag device 20, is an upper part of a seat back 1, and is secured to the side of a headrest 3. The housing 21 is made to deploy forward or diagonally forward when the airbag device 20 operates and an airbag 30 deploys.

In addition to being stowed in the housing 21 that is configured as a separate body, the head protecting cushions (32, 34, 36, and 38) can be stowed inside the seat back 1 near the upper end thereof. A stowage space for the head protecting cushions can be set flexibly, particularly in the case of a vehicle seat in which the headrest 3 is integrated into the seatback 1.

As illustrated in FIG. 2, a seatback frame 1f forming a skeleton of the seat is provided inside the seatback 1, a pad made of a urethane foam material or the like is provided on a surface and periphery thereof, and a surface of the pad is covered with a surface skin such as leather, fabric, or the like. A seating frame 2f is provided on the bottom side of the seat cushion 2, while a pad made of a urethane foaming material, or the like, is provided on the upper surface and periphery thereof, and the surface of this pad is covered with a skin such as leather, fabric, or the like. The seating frame 2f and the seatback frame 1f are connected via a reclining mechanism 4.

As illustrated in FIG. 2, the seat back frame 1f is configured into a frame shape by a seat frame 10 disposed laterally spaced apart and extending in the up-down direction, an upper frame connecting the upper end of the seat frame 10, and a lower frame connecting the lower ends thereof. The headrest 3 is configured by providing a cushioned member on an outer side of a headrest frame.

Figure 3:
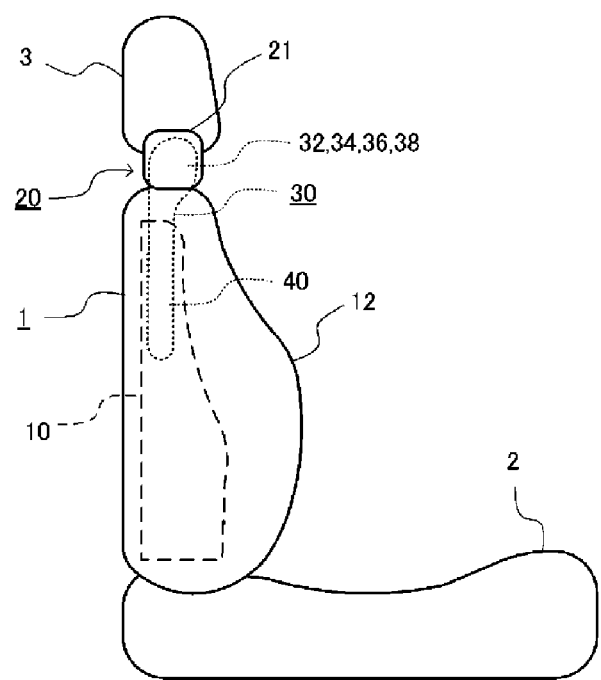
FIG. 3 is a schematic side surface view of the vehicle seat to which the airbag device according to an embodiment of the present invention has been mounted, depicting a condition where the airbag device is stowed therein, as viewed from the outside in the vehicle width direction.
Figure 3:
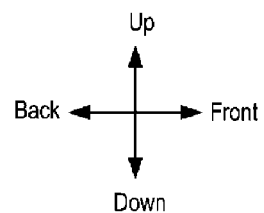

FIG. 3 is a schematic side view of the occupant protection device according to the present invention, and depicts the state in which the airbag device 20 stowed therein on the side face (far side) near the door of the vehicle seat is observed from the outside in the vehicle width direction.

As depicted in FIG. 3, the airbag device 20 is stowed near the right side upper end of the seatback 1 of the vehicle seat. As will be described later, the airbag 30 includes the head protecting cushions (32, 34, 36, and 38) that protect the head of the occupant and a side chamber 40 that protects the body side of the occupant. Note that, although provided on the so-called far side in the present embodiment, the airbag device 20 may also be provided on the near side.

Figure 4:
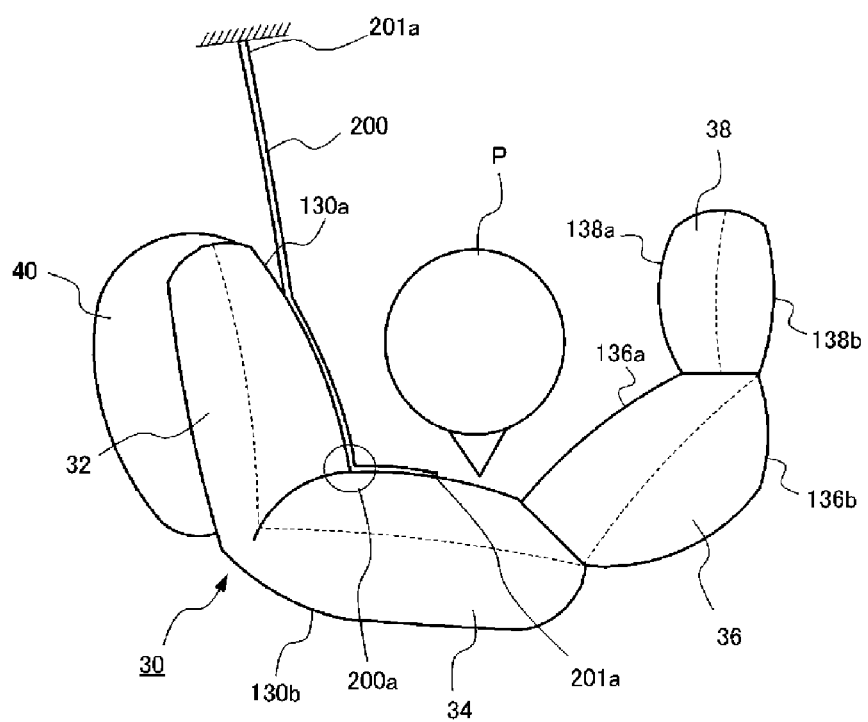
FIG. 4 is a top side view schematically depicting a condition where the airbag in the airbag device according to an embodiment of the present invention is deployed.
Figure 4:
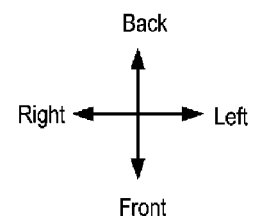
Figure 5:
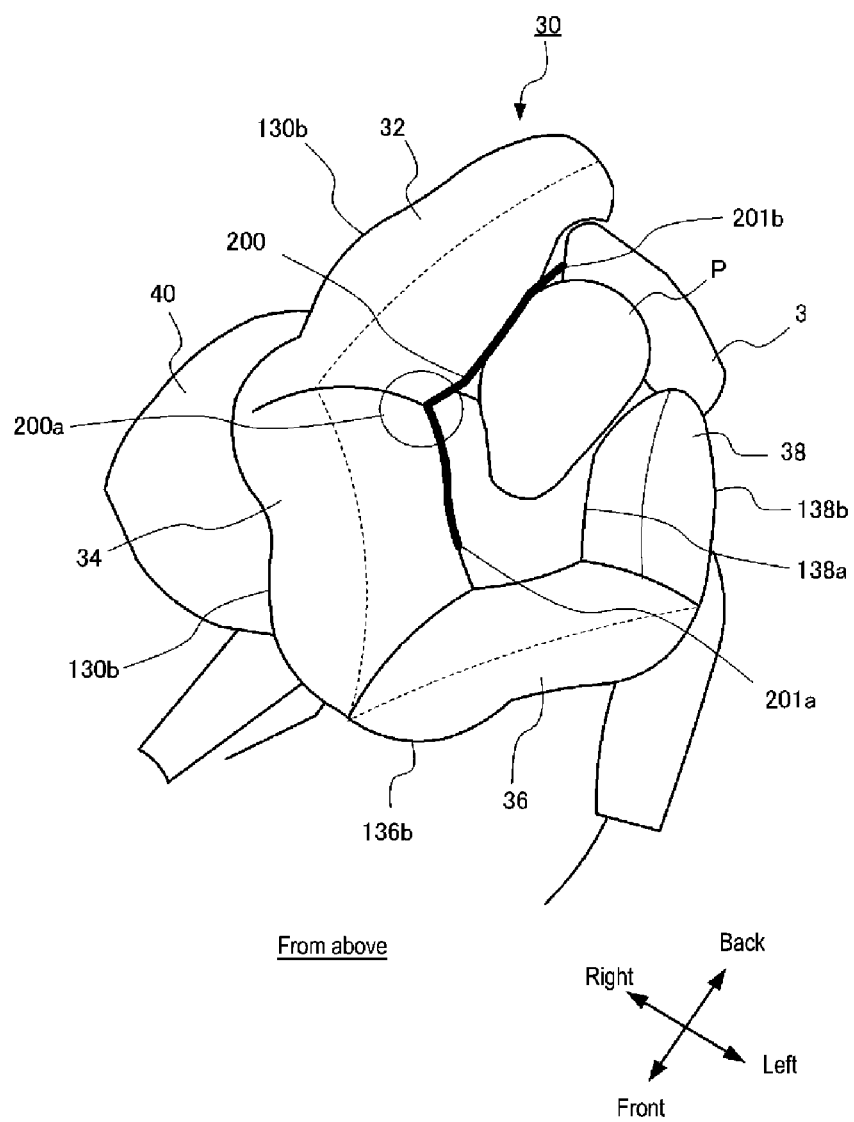
FIG. 5 is a top side perspective view (overhead view) depicting a condition where the airbag in the airbag device according to an embodiment of the present invention is deployed.
Figure 6:
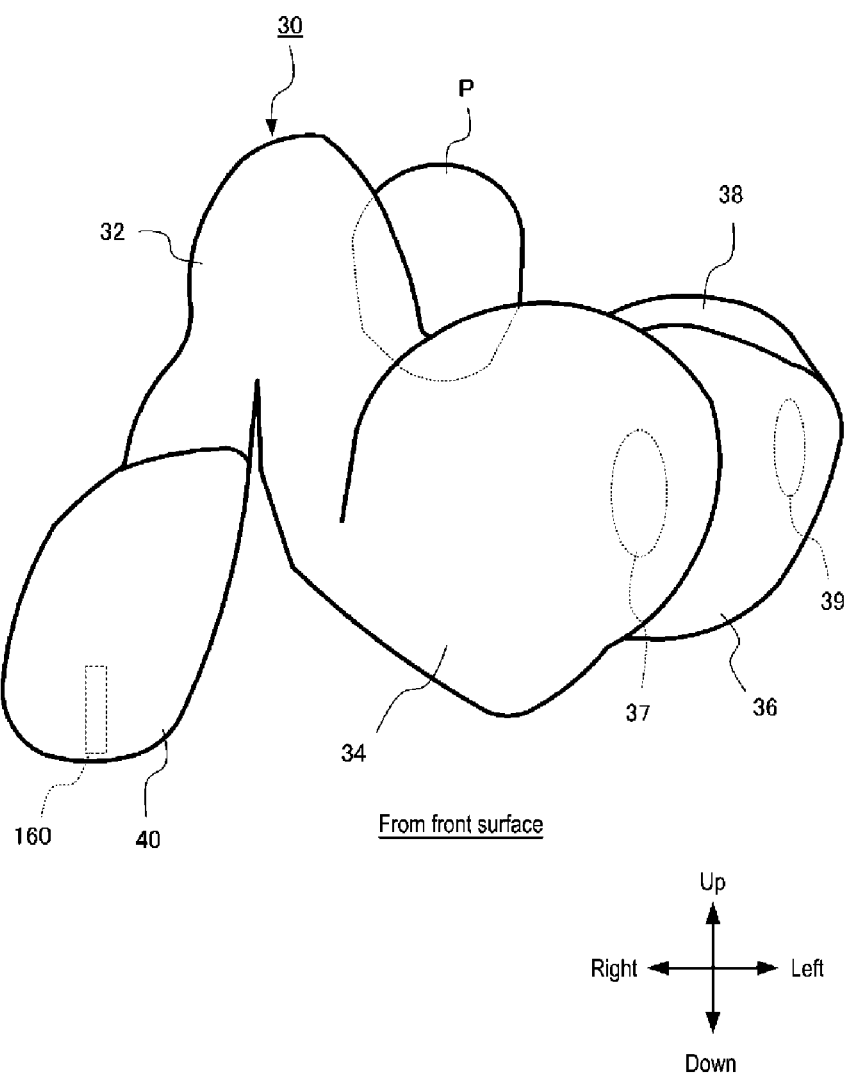
FIG. 6 is a front side perspective view depicting a condition where the airbag in the airbag device according to an embodiment of the present invention is deployed.

FIG. 4 is a top side view schematically depicting a condition where the airbag (30) in the airbag device 20 according to an embodiment of the present invention is deployed. FIG. 5 is a top side perspective view (overhead view) depicting a condition where the airbag (30) is deployed. FIG. 6 is a front side perspective view depicting a condition where the airbag (30) is deployed. Note that the dashed lines in FIG. 4 and FIG. 5 depict stitching lines.

As depicted in FIG. 4, the airbag device 20 according to the present embodiment includes an inflator 160 (see FIG. 6 and FIG. 8) that generates inflation gas and the airbag 30 that is inflated and deployed by the inflation gas supplied by the inflator 160. The airbag 30 includes the head protecting cushions (32, 34, 36, and 38) that protect the periphery of the head of the occupant P by deploying from near the right side upper end of the vehicle seat, and a side chamber 40 that protects the body side of the occupant.

The head protecting cushion includes a first chamber 32 that protects the right side of the head of an occupant P, a second chamber 34 that is connected to the first chamber 32 and that protects the front of the head of the occupant P, a third chamber 36 that is connected to the second chamber 34 and that deploys from the front across to the left side of the head of the occupant P, and a fourth chamber 38 that is connected to the third chamber 36 and that deploys on the left side of the head of the occupant P.

The airbag device 20 also includes a tether 200 that extends in the deployment direction (forward) of the airbag 30 and that restricts the deployment shape of the airbag 30, and a retaining member 202 that retains the tether 200 in a slidable state along the surface of the airbag 30. Details of the tether 200 and the retaining member 202 are described below with reference to FIG. 7.

The tether 200 includes a first end part 201a that is linked to the inside surface of the second chamber 34, and a second end part 201b on the side opposite the first end part 201a. Additionally, the second end part 201b is linked to a seat frame. Note that the second end part 201b (rear end) of the tether 200 can also link to structural parts other than the seat frame, or directly to near the rear end of the first chamber 32.

The first chamber 32 and the second chamber 34 are formed integrally as a single chamber. A portion near the rear of the second chamber 34 is bent toward the head of the occupant P, which makes it possible for the second chamber 34 to deploy reliably in front of the head of the occupant.

The tether 200 is linked so as to pass the first chamber 32 and the second chamber 34, and the second chamber 34 can be bent by tension from the tether 200 when the airbag 30 is deployed. Note that the tether 200, despite one end thereof being linked to the inner surface of the second chamber 34, may also be linked to the surface of the first chamber 32 or to another member such as the seat frame, or the like.

Figure 8:
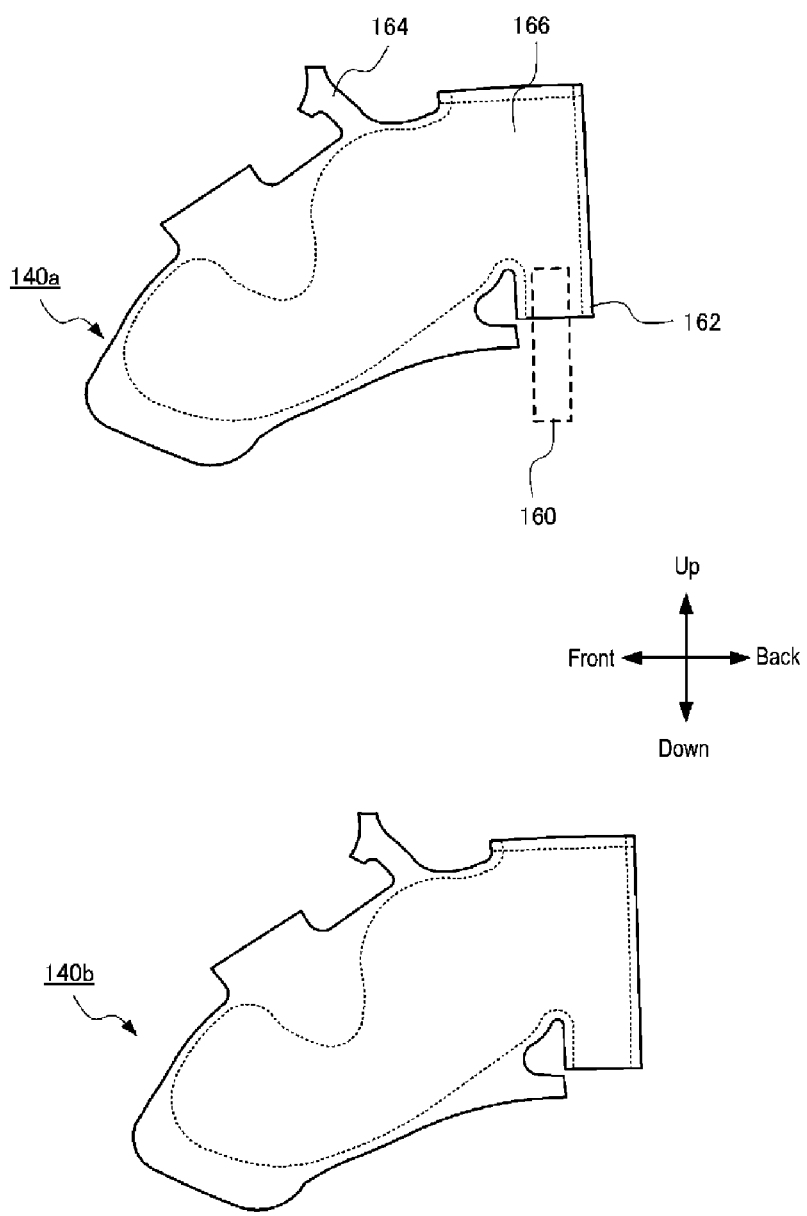
FIG. 8 is a plan view depicting the state of a panel that configures the airbag used in the airbag device according to an embodiment of the present invention, which panel forms a side chamber.

As depicted in FIG. 4 through FIG. 6, the side chamber 40 is linked below the first chamber 32. Although designed to restrain at least the right shoulder of the occupant P, the side chamber 40 may also be configured to restrain the waist thereof as well. The side chamber 40 and the first chamber 32 are configured so that both deploy simultaneously, or one deploys before the other depending on the direction and timing of the force applied to the occupant P to be protected. As depicted in FIG. 6 and FIG. 8, inflation gas is released from the inflator 160 stowed in the side chamber 40, and the gas flows sequentially through the first chamber and/or the side chamber 40, the second chamber 34, the third chamber 36, and then the fourth chamber 38.

As depicted in FIG. 4 and FIG. 5, the four chambers (32, 34, 36, and 38) deploy so as to surround a vicinity from near the right side to near the left side of the head of the occupant P. The second chamber 34 simultaneously deploys so as to bend in the direction (inward) of the occupant side from the first chamber 32 and to bend slightly upward as depicted in FIG. 6 to thus reliably protect the front, including the diagonal front, of the head (face) of the occupant P. The airbag 30 (at least the first chamber 32 and the fourth chamber 38) is positioned above the shoulder of the occupant P, which thus makes it possible to keep the shoulder of the occupant P from interfering with deployment behavior. Furthermore, mounting the airbag 30 above the shoulder of the occupant P can reduce the distance from the airbag 30 to the head of the occupant P, which makes it possible to restrain the head of the occupant quickly.

As depicted in FIG. 4 and FIG. 5, the longitudinal direction of the second chamber 34, when viewed from the top when the airbag 30 is inflated and deployed, is provided so as to extend in front of the occupant P at an angle from a flexing area 200a toward the long longitudinal direction in the front-to-back direction of the first chamber 32. Furthermore, the inflation/deployment direction of the third chamber 36 facing a gas inlet of the fourth chamber 38 from a gas inlet of the third chamber 36, which is near the terminus of the second chamber 34, is provided facing roughly opposite the longitudinal direction inflation/deployment direction of the first chamber 32 in the front-to-back direction, and at an angle in a direction approaching the occupant P from the terminus of the second chamber 34 with respect to the longitudinal direction of the inflated and deployed second chamber 34. Additionally, the inflation/deployment direction of the fourth chamber 38 from a gas inlet of the fourth chamber 38, which is near the terminus of the third chamber 36, is provided facing roughly opposite the longitudinal direction inflation/deployment direction of the first chamber 32 in the front-to-back direction, and at an angle in a direction approaching the occupant side P from the terminus of the third chamber 36 with respect to the inflation/deployment direction of the third chamber 36. By configuring in this way, the airbag 30 inflates and deploys so as to wind around the circumference of the head of the occupant P from one shoulder opening of the occupant P.

Figure 7:
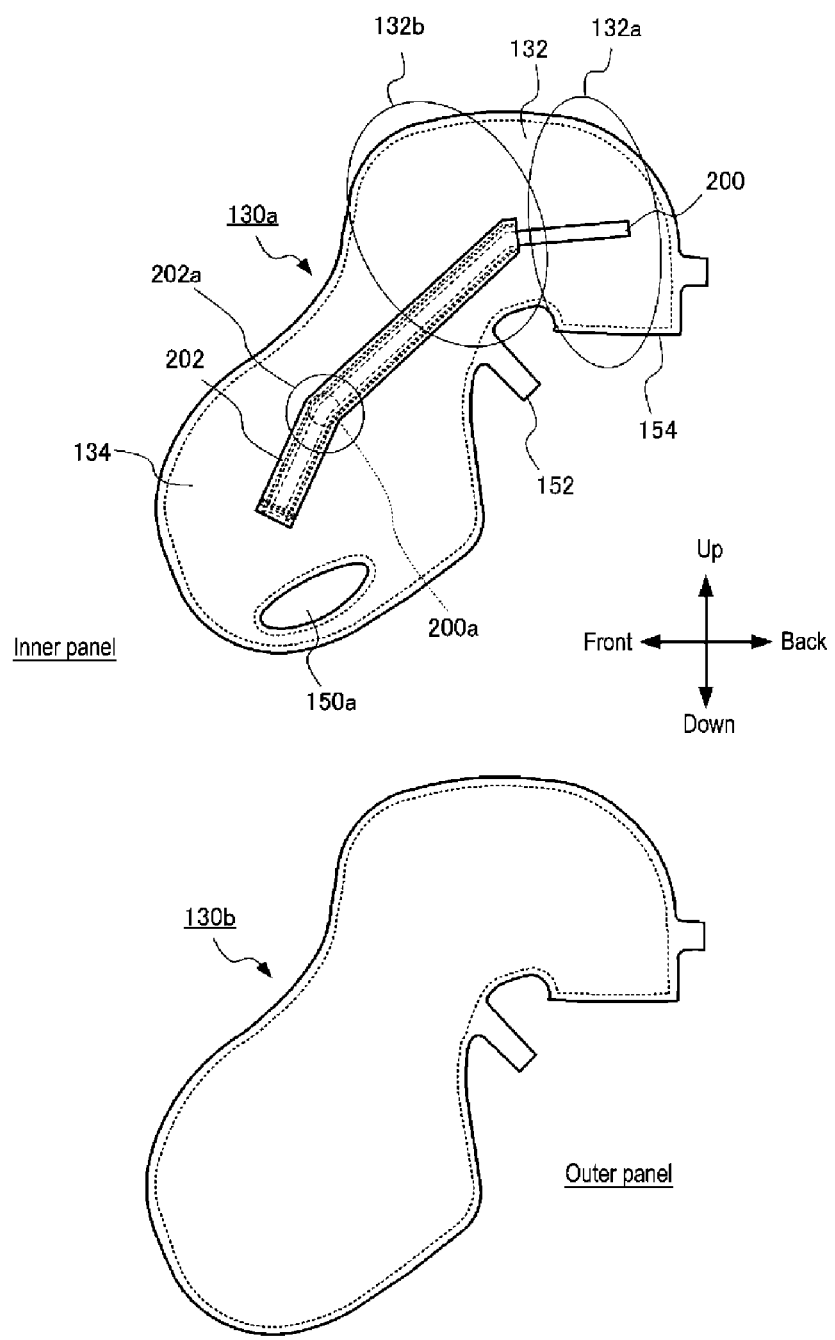
FIG. 7 is a plan view depicting the state of a panel that configures the airbag used in the airbag device according to an embodiment of the present invention, which panel forms first and second chambers.

FIG. 7 is a plan view depicting a panel (base fabric) that forms the first chamber 32 and the second chamber 34. As depicted in FIG. 7, the first chamber 32 and the second chamber 34 are formed integrally by adhering two pieces of base fabric 130a (interior panel) and 130b (exterior panel) together. In the figure, symbol 132 is a region corresponding to the first chamber 32, and 134 is a region corresponding to the second chamber. When the first chamber 32 and the second chamber 34 deploy, the interior panel 130a faces the occupant P side.

The first chamber 32 (the region 132) includes an opening part 154 that is linked to the side chamber 40, and a tab 152 that is linked to a tab 164 of the side chamber 40. The inflation gas flows into the first chamber 32 from near the rear end part of the side chamber 40 through the opening part 154. A vent opening 150a is formed near the end part of the inner panel of the second chamber 34, extending along the lower edge of the second chamber, in fluid communication with the third chamber 36, and linked with a vent opening 150b of an inner panel 136a of the third chamber 36 (see FIG. 9) by stitching around a periphery. A vent hole 37 is then formed by the vent openings 150a and 150b.

The first chamber 32 is configured to include an upper direction part 132a that guides gas that has flowed in from the opening part 154 upward, and a forward direction part 132b that is connected to the upper direction part 132a and expands forward. Note that in FIG. 7, the dashed lines other than those for the upper direction part 132a and the forward direction part 132b depict stitching lines.

In the first chamber 32, the inflation gas flows first into the upper direction part 132a, which allows the first chamber 32 to be quickly and reliably raised above a shoulder of the occupant P, making it possible to avoid interfering with the head of the occupant.

FIG. 8 is a plan view depicting a panel (base fabric) that forms the side chamber 40. As depicted in FIG. 8, the side chamber 40 is formed by adhering two pieces of base fabric 140a (interior panel) and 140b (exterior panel) together. In the figure, symbol 166 is an opening part linked to the opening 154a of the first chamber 32, and symbol 162 is an inflator retaining part for stowing the inflator 160. Symbol 164 is a tab that is linked to the tab 152 of the first chamber 32.

The side chamber 40 and the first chamber 32 are directly linked by the respective opening parts 154a and 166 thereof, and a deployment orientation can be controlled by connecting the tabs 152 and 164 together. Note that in FIG. 8, the dashed lines other than those for the inflator 160 depict stitching lines. The linked tab 164 is provided on the upper edge part of the side protecting cushion 40. The tab 152 of the first chamber 32 is provided on the lower edge part of the first chamber, and because these tabs 152 and 164 are connected to one another, mutual unintentional oscillation therebetween is reduced during inflation and deployment, which thus increases inflation and deployment stability. Furthermore, because the tabs 152 and 164 are linked together, inflation/deployment direction of an airbag cushion stays consistent during inflation and deployment, making it possible to more integrally and comprehensively protect the occupant P.

Figure 9:
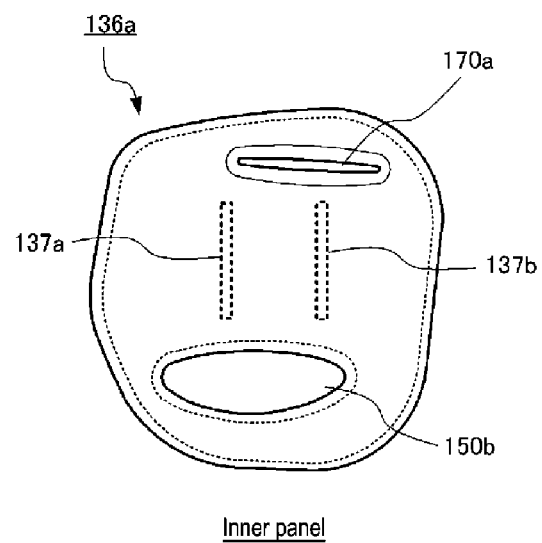
FIG. 9 is a plan view depicting the state of a panel that configures the airbag used in the airbag device according to an embodiment of the present invention, which panel forms a third chamber.
Figure 9:
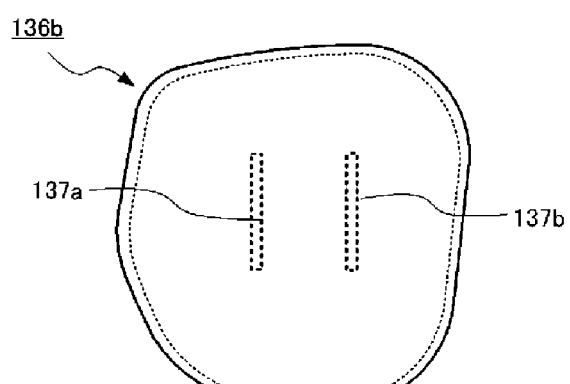

FIG. 9 is a plan view depicting a panel (base fabric) that forms the third chamber 36. In FIG. 9, the outer periphery dashed lines and the peripheral dashed lines on the openings 150b and 170 depict stitching lines.

As depicted in FIG. 9, the third chamber 36 is formed by adhering two pieces of base fabric 136a (interior panel) and 136b (exterior panel) together. The vent opening 150b linked to the vent opening 150a of the second chamber 34 is formed near one end part of the inner panel 136a. In addition, a vent opening 170a linked to a vent opening 170b of the fourth chamber 38 is formed near the other end part of the inner panel 136a. Furthermore, the vent openings 170a, 170b form a vent hole 39 (FIG. 7 and FIG. 9). Note that the vent hole opening 150b is longer in the short direction and has a larger opening area than the vent opening 170a.

Two inner tethers 137a and 137b that extend approximately parallel to the direction in which the gas flows are provided inside the third chamber 36 near the center thereof. These inner tethers 137a and 137b link the inner panel 136a and the outer panel 136b and restrict the deployment thickness (direction perpendicular to the page surface) of the third chamber 36. Note that in place of the tethers, the deployment thickness of the third chamber 36 can also be restricted by linking the inner panel 136a and the outer panel 136b simply by stitching the two together.

Figure 10:
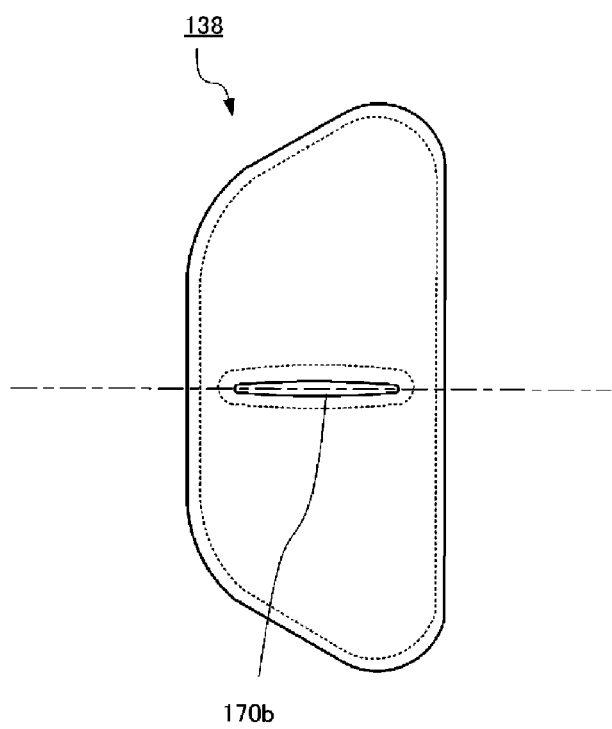
FIG. 10 is a plan view depicting the state of a panel that configures the airbag used in the airbag device according to an embodiment of the present invention, which panel forms a fourth chamber.

FIG. 10 is a plan view depicting a panel (base fabric) 138 that forms the fourth chamber 38. The dashed lines in FIG. 10 depict stitching lines.

As depicted in FIG. 10, the fourth chamber 38 is formed into a bag shape by folding one panel 138 in half from the center portion thereof. A vent hole 170b, which is linked to a vent hole 170a of the third chamber, is formed near the longitudinal center of the panel 138, and the center line along the longitudinal direction of the vent opening 170b becomes a crease in the panel 138.

Figure 11:
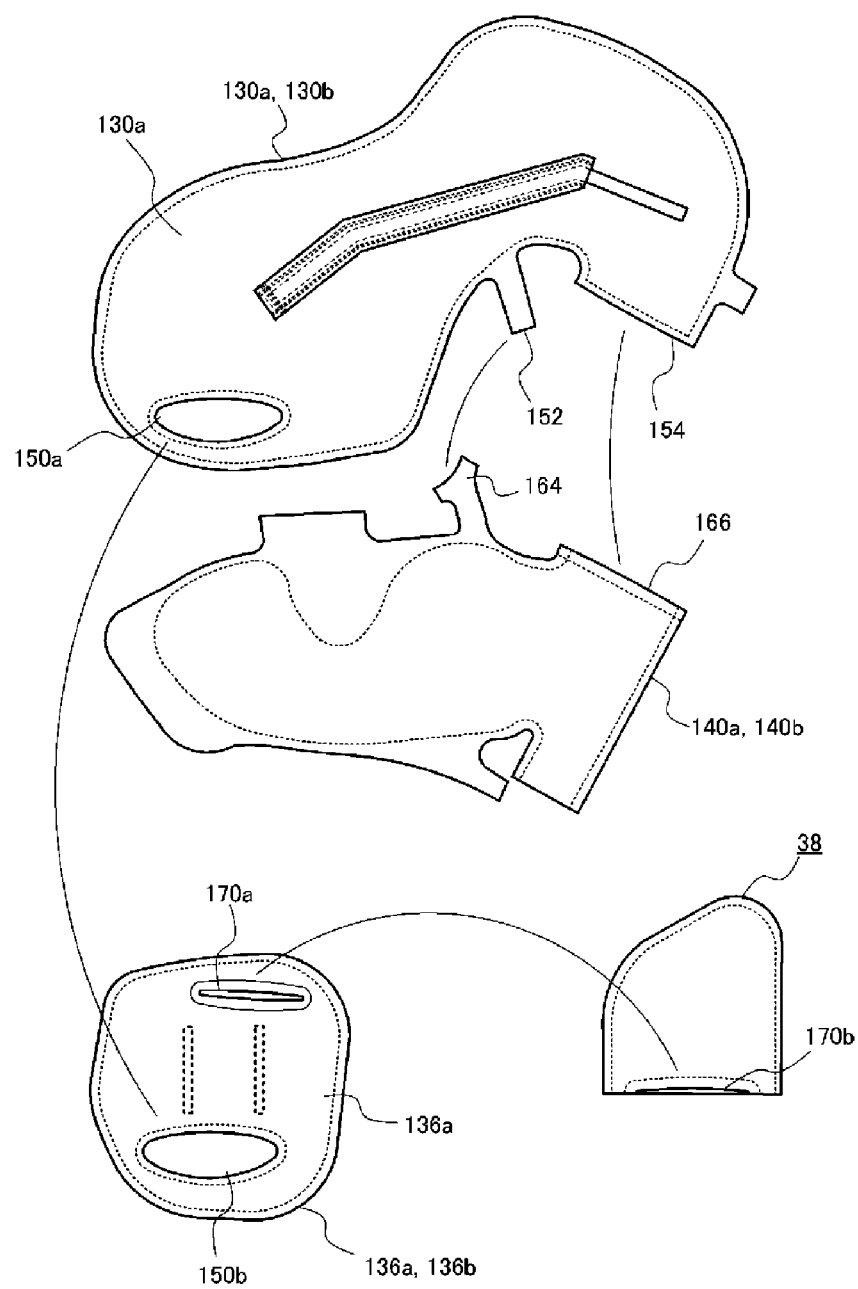
FIG. 11 is a plan view for describing the linking of the panels depicted in FIG. 7 through FIG. 10.
Figure 12:
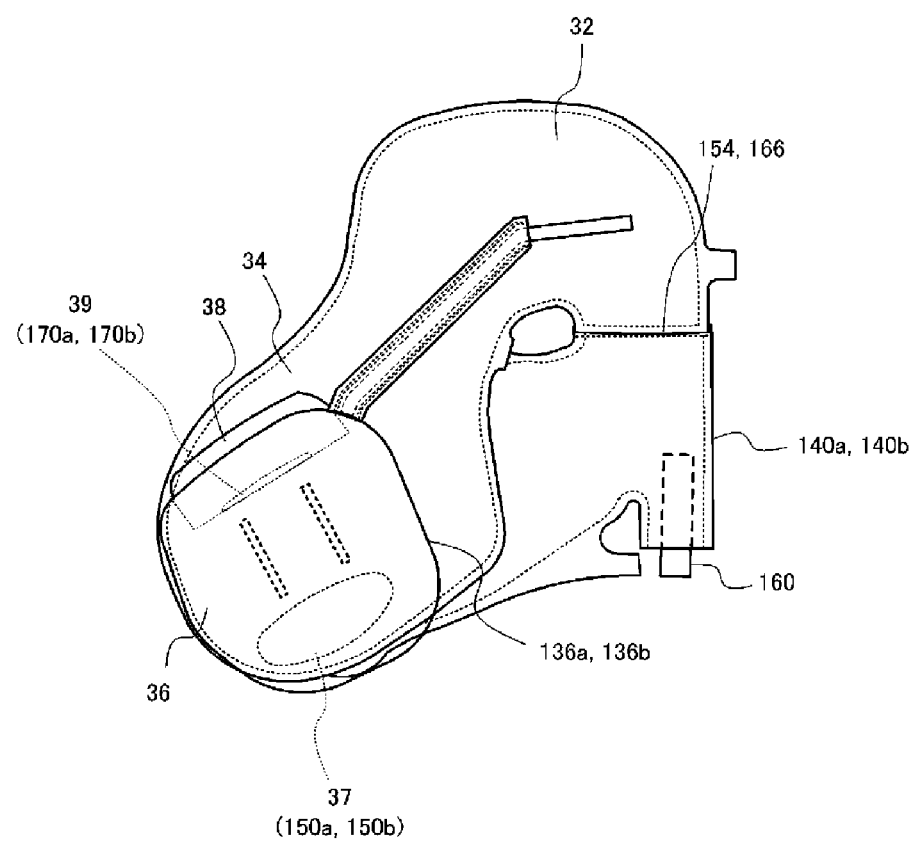
FIG. 12 is a plan view depicting a state where the panels depicted in FIG. 7 through FIG. 10 are linked.

FIG. 11 is a plan view for describing the linking of the panels depicted in FIG. 7 to FIG. 10. In addition, FIG. 12 is a plan view depicting a state where the panels depicted in FIG. 7 to FIG. 10 are linked. As depicted in FIG. 11, the chamber that integrates the first chamber 32 and second chamber 34 has the largest capacity, followed by the side chamber 40. In contrast, the capacity of the third chamber 36 is small, and the capacity of the fourth chamber 38 is designed to be even smaller.

The second chamber 34 and the third chamber 36 are linked by stitching only around the vent openings 150a and 150b. In addition, the third chamber 36 and fourth chamber 38 are linked by stitching only around the vent openings 170a and 170b.

(Airbag Compression)

Figure 13:
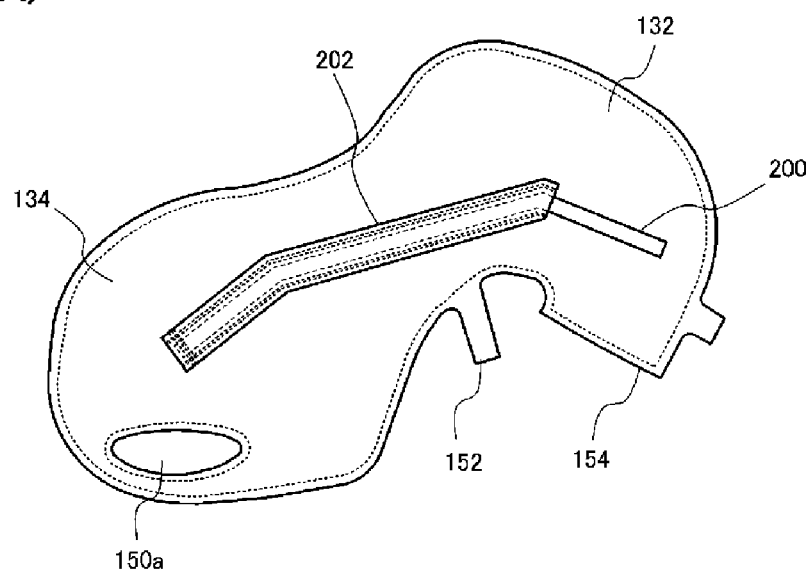
FIG. 13 is a plan view depicting one part of a process for compressing the airbag according to an embodiment of the present invention, where only the first and second chambers are depicted, and depiction of other chambers (FIG. 12) is omitted for the convenience of description.
Figure 13:
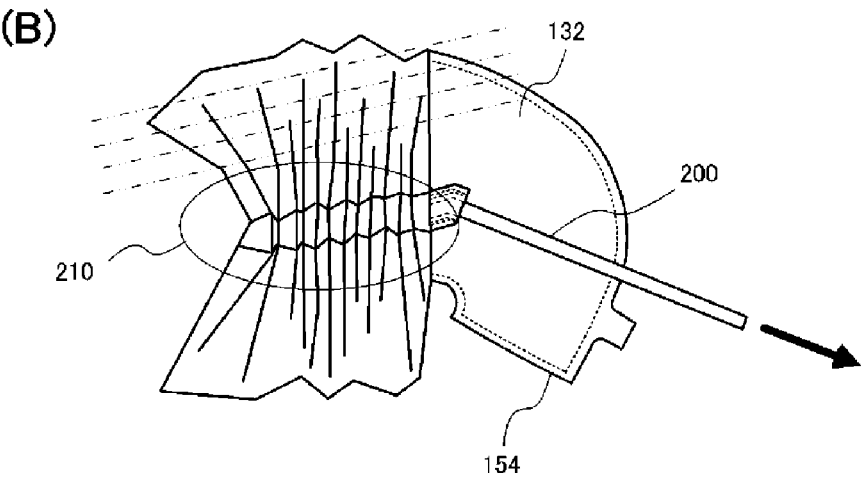

FIG. 13 is a plan view depicting one part of a process for compressing the airbag 30 according to an embodiment of the present invention, where only the first chamber 32 and the second chamber 34 are depicted and depiction of the other chambers (the third chamber 36, the fourth chamber 38, and the side chamber 40) is omitted. In fact, a compression process is performed after all of the chambers have been linked by stitching as depicted in FIG. 12.

The tether 200 is pulled (draw in) backward from the state depicted in FIG. 13 (A) to form a wrinkled region 210 around the tether 200 of the first chamber 32 and the second chamber 34 (FIG. 13 (B)). Thereafter, the upper portion of the wrinkled region 210 is compressed toward the center (downward) by a method such as bellows folding, or the like. Note that both simple shrinking and a somewhat regular folding pattern such as bellows folding may be used to form the "wrinkles" of the wrinkled region 210.

Figure 14:
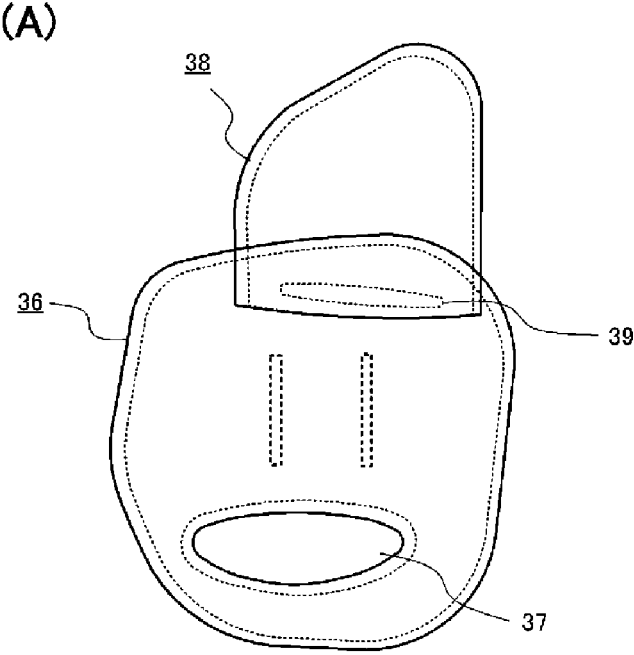
FIG. 14 includes plan views (A) and (B) and a cross section view (C) depicting one part of a process for compressing the airbag according to an embodiment of the present invention, where only the third and fourth chambers are depicted, and depiction of other chambers (FIG. 12) is omitted for the convenience of description.
Figure 14:
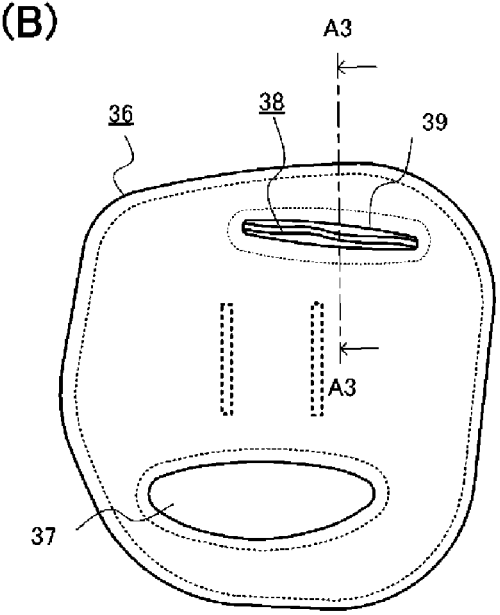
Figure 14:
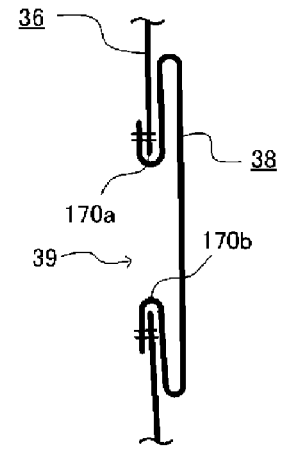

FIG. 14 includes plan views (A) and (B) and a cross section view (C) depicting one part of a process for compressing the airbag according to an embodiment of the present invention, where only the third chamber 36 and the fourth chamber 38 are depicted and depiction of other chambers is omitted for the convenience of description.

As depicted in FIG. 14 (A), the fourth chamber 38 linked to the third chamber 36 is tucked into the third chamber 36 through the vent hole 39. Here, "tucked in", broadly speaking, means being folded inward. The sense, in the present embodiment, is that the fourth chamber 38 is inserted into the vent hole 39 while being turned upside down. Because the inner tethers 137 and 137*b* are provided inside the third chamber 36, the fourth chamber 38 is actually inserted between the inner tethers 137*a* and 137*b* at this time (FIG. 15).

Because the leading side (downstream side) of the fourth chamber 38 is tucked inside the adjacent third chamber 36 in the present embodiment, the deployment of the fourth chamber 38 is delayed compared to the first through third chambers (32, 34, and 36). Therefore, the tip (most downstream side) of the fourth chamber 38 deploys immediately after passing in front of the head of the occupant, and thus the fourth chamber 38 is able to deploy without interfering with the head of the occupant while wrapping around the head of the occupant P.

Figure 15:
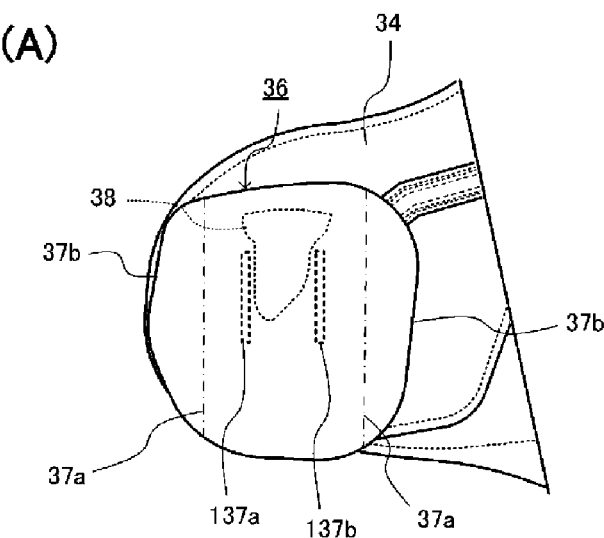
FIG. 15 includes plan views (A) and (B) and a cross section view (C) depicting one part of a process for compressing the airbag according to an embodiment of the present invention, where depiction of the first chamber (FIG. 12) is omitted for convenience of description.
Figure 15:
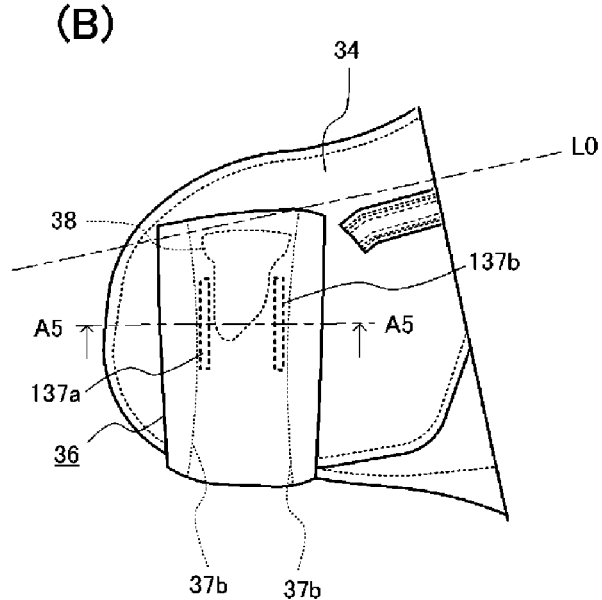
Figure 15:
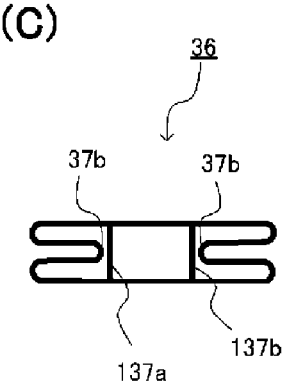

FIG. 15 includes plan views (A) and (B) and a cross section view (C) depicting one part of a process for compressing the airbag according to an embodiment of the present invention, where depiction of the first chamber 32 is omitted for convenience of description. FIG. 15 (A) depicts the fourth chamber 38 already tucked inside the third chamber 36. Note that, with respect to the second chamber 34, the wrinkled region 210 is actually formed as depicted in FIG. 13 (B) but is depicted as being flat for convenience.

An edge part 37*b* that faces in the forward direction of the third chamber 36 is tucked in from the state depicted in FIG. 15 (A) along a fold line 37*a* in the center direction as depicted in FIGS. 15 (B) and (C). In the present embodiment, the inner tethers 137*a* and 137*b* are provided inside the third chamber 36, and thus the edge part 37*b* can be folded to a position where the parts reach the inner tethers 137*a* and 137*b*.

Figure 16:
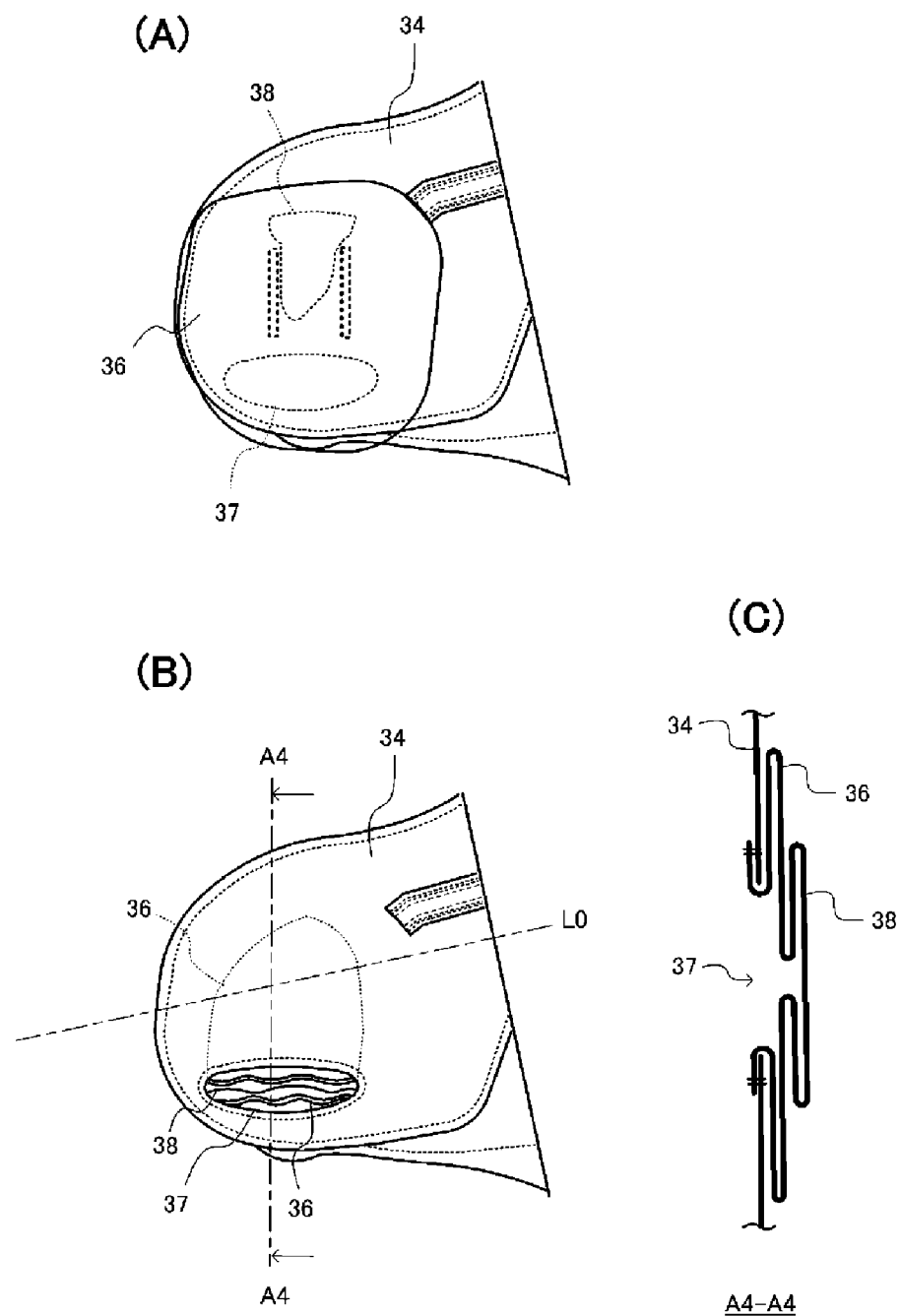
FIG. 16 includes plan views (A) and (B) and a cross section view (C) depicting one part of a process for compressing the airbag according to another embodiment of the present invention, where depiction of the first chamber (FIG. 12) is omitted for convenience of description.

FIG. 16 includes plan views (A) and (B) and a cross section view (C) depicting one part of a process for compressing the airbag according to another embodiment of the present invention, where depiction of the first chamber (FIG. 12) is omitted for convenience of description. The state depicted in FIG. 16 (A) is the same as the state depicted in FIG. 15 (A). Note that, with respect to the second chamber 34, in the same way as in FIGS. 15 (A) and (B), the wrinkled region 210 is actually formed as depicted in FIG. 13 (B) but is depicted as being flat for convenience.

In the present embodiment, the third chamber 36 with the fourth chamber 38 tucked (stowed) therein is further tucked into the second chamber 34 through the vent hole 37 as depicted in FIGS. 16 (B) and (C).

After that, all of the head protecting cushions (32, 34, 36, and 38) are folded vertically from the state depicted in FIG. 15 (B) or FIG. 16 (B), and then rolled or bellows folded toward the upstream (first chamber 32) side from the leading side (downstream side). Here, "vertically" can be roughly vertical on the page surfaces of FIG. 15 (B) and FIG. 16 (B), or a direction orthogonal to a line L0 that is inclined slightly higher on the first chamber 32 side. Alternatively, "vertically" can express a direction orthogonal to the longitudinal direction of the head protecting cushion. Furthermore, "the upstream side from the leading side (downstream side)" is the direction left to right roughly along the line L0, and can be understood as the direction facing backwards from the leading side of the longitudinal direction of the head protecting cushion.

(Airbag Deployment Behavior)

As depicted in FIG. 4 through FIG. 6, in the airbag device 20 according to the present embodiment, when a vehicle crash event occurs, the inflator 160 is activated and the inflation gas flows from the inflator retaining part 162 near the rear end part of the side chamber 40 into the first chamber 32. When the inflation gas flows into the first chamber 32, the upper direction part 132*a* (FIG. 7) expands first, followed by the forward direction part 132*b*. Next, the gas flows from the first chamber 32 into the second chamber 34.

Since the tether 200 (FIG. 4) links the first chamber 32 to the second chamber 34, or the second chamber 34 to the seat frame, the second chamber 34 is restricted from deploying forward, and the flexure 200*a* of the tether 200, or in other words, a flexing area 202*a* of the retaining member 202 flexes as the starting point, and deploys toward the front of the occupant (FIG. 4 and FIG. 5). The second chamber 34 flexes so that the leading side faces upward and the vent opening 150*a* is roughly vertical, as depicted in FIG. 6.

Next, the inflation gas flows from the second chamber 34 into the third chamber 36 through the vent hole 37, and the third chamber 36 inflates the front surface of the occupant P toward near the left side of the head. The inner panel 134*a* of the second chamber 34 and inner panel 136*a* of the third chamber 36 are linked around the vent hole 37. Therefore, the behavior of the third chamber 36 to deploy outward (away from the head of the occupant) is restricted, creating a curved shape so as to surround the head of the occupant P.

Next, the inflation gas flows from the third chamber 36 into the fourth chamber 38 through the vent hole 39, and the fourth chamber 38 deploys near the left side of the head of the occupant P. The inner panel 136*a* of the third chamber 36 and the fourth chamber 36 are linked around the vent hole 39. Therefore, the behavior of the fourth chamber 36 to deploy outward (away from the head of the occupant) is restricted, creating a curved shape so as to surround the head of the occupant P.

Because the tuck in process is used on the third chamber 36 in the present embodiment, the third chamber 36 deploys after the first chamber 32 and the second chamber 34. That is, a deployment behavior where the first chamber 32 through the fourth chamber 38 deploy in a staged manner from the upstream side (one side of the head of the occupant) to the downstream side (the other side of the head of the occupant) can be achieved. As a result, a circumstance where the third chamber 36 or the fourth chamber 38 interferes with or makes contact with the head of the occupant can be avoided in the initial deployment stage of the airbag 30.

Furthermore, the structure is such that the tether 200 slides along the surface of the airbag 30 in a way that keeps the tether 200 from protruding bridge-like from the surface of the airbag 30, thus avoiding unnecessary interference with the occupant P. The structure also enables reliable and precise control of the deployed shape of the airbag 30. These structures allow the airbag 30 to inflate and deploy so as to wrap around the head of the occupant P.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications. For example, while a side airbag on the far side has been predominantly mentioned in the Description of the Preferred Embodiments, use is also possible with a near side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. An airbag device, comprising: an airbag that includes a head protecting cushion that protects a head of an occupant by deploying on the left or right above a vehicle seat; and
an inflator that supplies inflation gas to the airbag, wherein
the head protecting cushion includes a first chamber that protects a vicinity near one side of the head of the occupant, a second chamber that is connected to the first chamber and that protects the front of the head of the occupant, a third chamber that is connected to the second chamber and that deploys from the front across to the other side of the head of the occupant, and a fourth chamber that is connected to the third chamber and that deploys in a vicinity near the other side of the head of the occupant;
the third chamber and the fourth chamber are structured to be connected by a first vent hole, and linked to one another by stitching around the first vent hole; and
the fourth chamber is, when the head protecting cushion is stowed, tucked inside the third chamber through the first vent hole.

2. The airbag device according to claim 1, wherein the second chamber and the third chamber are structured to be connected by a second vent hole and linked to one another by stitching around the second vent hole, and
the third chamber is, when the head protecting cushion is stowed, tucked inside the second chamber through the second vent hole.

3. The airbag device according to claim 1, wherein the third chamber is structured, when the head protecting cushion is stowed, tucked in such that the outer peripheral portion thereof faces the center of the chamber.

4. The airbag device according to claim 3, wherein a tether is provided that restricts a deployment state of the chamber, and
the third chamber is, when the head protecting cushion is stowed, such that the outer peripheral portion thereof is tucked in towards the tether.

5. The airbag device according claim 1, wherein the first chamber and second chamber are structured to be integrally formed by adhering two pieces of base fabric together.

6. The airbag device according to claim 5, wherein the third chamber is formed by adhering at least two pieces of base fabric together, and
structured so that a vicinity of an end part of an inner panel of the base fabric that forms the second chamber facing the occupant and a vicinity of an end part of an inner panel facing the occupant of the base fabric that forms the third chamber are linked.

7. The airbag device according to claim 5, wherein the fourth chamber is structured and formed by folding one piece of base fabric or adhering two pieces of base fabric together.

8. The airbag device according to claim 1, wherein the airbag also includes a side protecting chamber that protects the body side of the occupant by connecting to a vicinity of a lower end of the first chamber.

9. The airbag according to claim 8, wherein the inflator is provided inside the side protecting chamber, and
is configured so that inflation gas flows from the side protecting chamber into the first chamber, the second chamber, the third chamber, and the fourth chamber.

10. The airbag device according to claim 1, wherein the first chamber includes an upper direction part for first deploying upward and a forward direction part connected to the upper direction part for deploying toward the front.

11. The airbag device according to claim 1, wherein the airbag is structured so that when stowed, the first chamber, second chamber, third chamber, and fourth chamber that form the head protecting cushion can be folded vertically as one unit, and then folded into a roll or a bellows backwards from a tip end part corresponding to a front of a vehicle.

12. A vehicle seat, comprising: the airbag device according to claim 1; and
a side airbag device that protects a side of an occupant on a side opposite a side in which the airbag device is stowed.

* * * * *